United States Patent
Corston-Petrie et al.

(10) Patent No.: US 11,665,635 B2
(45) Date of Patent: May 30, 2023

(54) NETWORK SLICE MANAGEMENT

(71) Applicant: BRITISH TELECOMMUNICATIONS PUBLIC LIMITED COMPANY, London (GB)

(72) Inventors: Andrew Corston-Petrie, London (GB); Ruth Brown, London (GB); Jonathan Hart, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 84 days.

(21) Appl. No.: 17/280,401

(22) PCT Filed: Sep. 24, 2019

(86) PCT No.: PCT/EP2019/075649
§ 371 (c)(1),
(2) Date: Mar. 26, 2021

(87) PCT Pub. No.: WO2020/064697
PCT Pub. Date: Apr. 2, 2020

(65) Prior Publication Data
US 2021/0385741 A1 Dec. 9, 2021

(30) Foreign Application Priority Data
Sep. 27, 2018 (EP) .................................... 18197272

(51) Int. Cl.
*H04W 48/18* (2009.01)
*H04W 24/08* (2009.01)
*H04W 48/02* (2009.01)

(52) U.S. Cl.
CPC ........... *H04W 48/18* (2013.01); *H04W 24/08* (2013.01); *H04W 48/02* (2013.01)

(58) Field of Classification Search
CPC ...... H04W 48/18; H04W 48/02; H04W 24/08
(Continued)

(56) References Cited

U.S. PATENT DOCUMENTS 10,070,344 B1   9/2018  Dowlatkhah
10,541,877 B2 * 1/2020  Bainbridge ............. H04L 41/40
(Continued)

FOREIGN PATENT DOCUMENTS

EP      3358887      8/2018
JP      2017/170690  2/2019
(Continued)

OTHER PUBLICATIONS

Taleb et al., "On Multi-Access Edge Computing", IEEE Communications Surveys & Tutorials, vol. 19, No. 3, Third Quarter 2017, 25 pages.*
(Continued)

Primary Examiner — Mong-Thuy T Tran
(74) Attorney, Agent, or Firm — Nixon & Vanderhye P.C.

(57) ABSTRACT

The method of managing processing resources in a telecommunications network, the telecommunications network having a plurality of network slices and a User Equipment (UE), wherein the UE is allocated to a first network slice to process a network communication from the UE, the method comprising the steps of: monitoring a suitability of the first network slice to process the network communication; identifying a second network slice that is suitable for processing the network communication; and in response to identifying a lack of suitability of the first network slice to process the network communication, reallocating processing resources from the second network slice to the first network slice whilst the UE remains allocated to the first network slice.

26 Claims, 5 Drawing Sheets

(58) Field of Classification Search
USPC .......................................................... 370/329
See application file for complete search history.

(56) References Cited

U.S. PATENT DOCUMENTS

| | | | |
|---|---|---|---|
| 11,240,720 B2 | 2/2022 | Shih et al. | |
| 2009/0137227 A1 | 5/2009 | Beneheikh | |
| 2017/0054595 A1 | 2/2017 | Zhang | |
| 2017/0086118 A1 | 3/2017 | Vrzic | |
| 2017/0156174 A1* | 6/2017 | Chaponniere | H04W 48/18 |
| 2018/0123878 A1* | 5/2018 | Li | H04L 41/122 |
| 2018/0287891 A1* | 10/2018 | Shaw | H04W 24/02 |
| 2018/0352501 A1 | 12/2018 | Zhang et al. | |
| 2019/0021125 A1 | 1/2019 | Bischinger | |
| 2019/0149998 A1* | 5/2019 | Yang | H04L 41/0896 370/328 |
| 2019/0281494 A1* | 9/2019 | Chan | H04W 24/08 |
| 2019/0327153 A1* | 10/2019 | Wahlqvist | H04L 41/342 |
| 2019/0372837 A1 | 12/2019 | Yang et al. | |
| 2020/0228968 A1 | 7/2020 | Bernardos et al. | |
| 2021/0036920 A1* | 2/2021 | Erman | H04L 41/0895 |
| 2021/0153077 A1 | 5/2021 | Samdanis et al. | |
| 2022/0038953 A1* | 2/2022 | Corston-Petrie | H04W 60/04 |

FOREIGN PATENT DOCUMENTS

| | | |
|---|---|---|
| WO | 2017/123277 | 7/2017 |
| WO | 2017/143047 | 8/2017 |
| WO | 2017/173404 | 10/2017 |
| WO | 2017/177364 | 10/2017 |
| WO | 2017/214932 | 12/2017 |
| WO | 2018/077253 | 5/2018 |
| WO | 2018/170135 | 9/2018 |
| WO | 2020/064242 | 4/2020 |
| WO | 2020/064250 | 4/2020 |

OTHER PUBLICATIONS

Office Action dated Jun. 27, 2022 issued in U.S. Appl. No. 17/280,418 (18 pages).
Examination Report dated Apr. 6, 2021 issued in GB Application No. GB1815770.1 (4 pages).
Examination Report dated Mar. 12, 2021 issued in GB Application No. GB1815776.8 (2 pages).
International Search Report and Written Opinion of the ISA for PCT/EP2019/072935, dated Sep. 24, 2019 (17 pages).
Search Report for EP18197272.0, dated Dec. 18, 2018, 12 pages.
International Search Report and Written Opinion of the ISA for PCT/EP2019/075649, dated Nov. 11, 2019 (15 pages).
International Search Report and Written Opinion of the ISA for PCT/EP2019/072807, dated Sep. 19, 2019 (17 pages).
"3rd Generation Partnership Project; Technical Specification Group Services and System Aspects; Telecommunication management; Study on management and orchestration of network slicing for next generation network (Release 15)", 3GPP Draft; 28.801-F10, 3rd Generation Partnership Project (3GPP), Mobile Competence Centre ; 650, Route Des Lucioles ; F-06921 Sophia-Antipolis Cedex; France , Dec. 27, 2017 (Dec. 27, 2017), XP051391119 (75 pages).
Huawei et al.: "Add use case and requirements for resource balancing among NSIs", 3GPP Draft; S5-171680 PCR TR 28.801 Add Use Case and Requirements for Resource Balancing Among NSIS, 3rd Generation Partnership Project (3GPP), Mobile Competence Centre ; 650, Route Des Lucioles; F-O, vol. SA WG5, No. Guilin (China); Mar. 27, 2017-Mar. 31, 2017 Mar. 25, 2017 (Mar. 25, 2017), XP051248774, (2 pages).
Salhab, et al., "Optimization of the implementation of network slicing in 5G RAN" 2018 IEEE Middle East and North Africa Communications Conference (MENACOMM), 6 pages.
ZTE: "Consideration on RAN Side Network Slicing", 3GPP Draft; R3-160821 Consideration on RAN Side Network Slicing V5, 3rd Generation Partnership Project (3GPP), Mobile Competence Centre. • 650, Route Des Lucioles. F-06921 Sophia-Antipolis Cedex; FRA• vol. RAN WG3, No. Bangalore, India; Apr. 11, 2016-Apr. 15, 2016 Apr. 1, 2016 (Apr. 1, 2016), XP051082958, (9 pages).
Stellarix Novelty Search Report, Topic Network Slice Resource Assistance A33732 Aug. 21, 2018 (24 pages).

\* cited by examiner

NETWORK SLICE MANAGEMENT

This application is the U.S. national phase of International Application No. PCT/EP2019/075649 filed Sep. 24, 2019 which designated the U.S. and claims priority to EP Patent Application No. 18197272.0 filed Sep. 27, 2018, the entire contents of each of which are hereby incorporated by reference.

FIELD OF INVENTION

The present invention relates to a method of, and to a telecommunications network for, managing network processing resources, and in particular amongst network slices.

BACKGROUND

Network slicing is a method of virtualising a network so as to create multiple logical networks within a single physical network. This is typically undertaken to offer differentiated service models, which might include varying performance and/or stability characteristics within a network, and it is supported by the fact that network slices are isolated from one another other during operation. As a result, high traffic or a large number of users on one slice is unable to negatively to affect other network slices.

For example, network slices may be configured to provide specialised functions, including: exclusively serving emergency services (which demands, at least, reliability); enhanced Mobile Broadband (eMBB); and Massive Machine Type Communications (MMTC).

A network will adapt network slices to suit network conditions and to optimise utilisation of individual network slices. To ensure constant availability of resources as network slices' resources are consumed, scaling occurs. If a network slice reaches a threshold utilisation the creation of additional slice resources may be triggered so as to cope with high network loads; this is typically achieved by 'scaling up' or by 'scaling out' a network slice. The allocation of new processing resources to a network slice (via scaling) can take a matter of minutes, and typically around 2 to 10 minutes. However, during such scaling new users may be prevented from joining the slice or potential network congestion may be experienced by users.

It is an aim of the present invention at least to alleviate some of the aforementioned problems.

STATEMENTS OF INVENTION

According to a first aspect of the present invention, there is provided a method of managing processing resources in a telecommunications network, the telecommunications network having a plurality of network slices and a User Equipment (UE), wherein the UE is—optionally, initially—allocated to a first network slice for processing a network communication from the UE, the method comprising the steps of: monitoring a suitability of the first network slice to process the network communication; identifying a second network slice that is suitable for processing the network communication; and in response to identifying a lack of suitability of the first network slice to process the network communication, reallocating processing resources from the second network slice to the first network slice whilst the UE remains allocated to (or registered with) the first network slice. Optionally, the telecommunications network has a plurality of UEs. Optionally, the aforementioned steps of monitoring, identifying and/or reallocating are performed within the telecommunications network, and in particular within a core of the telecommunications network.

As used herein, the term "is suitable" in reference to identifying the second network slice for processing the network communication, preferably connotes a network slice that is currently suitable or is expected to become suitable.

As used herein, the term "allocated" with reference to the allocation of the UE to the first network slice, preferably connotes: the identification or selection of the first network slice as a suitable network slice with which to register the UE, but where the UE has not yet—but is to be—registered with the first network slice; where the UE is registering with the first network slice; and/or where the UE is already registered with the first network slice.

Optionally, the network communication is: a data packet; a part thereof; a plurality of data packets; and/or a data session. The network communication may be an attach request or may follow an attach request.

Preferably, the processing resources are reallocated before the network communication is received by the first network slice, and more preferably, before any part of the network communication is received and/or processed by the first network slice or before all of the network communication is received and/or processed by the first network slice.

Preferably, reallocating network resources comprises reconfiguring a logical isolation boundary between the first and second network slices. Preferably, reallocating resources comprises adjusting the relative share of processing resources between the first and second network slices.

Preferably, reallocating resources is performed without increasing the total amount of processing resources in the first and second network slices, or the total amount of processing resources in the second network slice only.

Preferably, the method further comprises the step of identifying the second network slice in response to identifying a lack of suitability of the first network slice.

Preferably, the amount of processing resources reallocated to the first network slice is equal to or greater than an amount of processing resources required to render the first network slice suitable to process the network communication.

Optionally, after reallocating processing resources from the second network slice, the second network slice comprises a remaining amount of processing resources that is sufficient for the second network slice to be suitable for processing each network communication allocated to the second network slice.

Preferably, the proportion of processing resources available to be reallocated to the first network slice is capped. Preferably, the total amount of processing resources available to be reallocated is capped.

Preferably, the first (and/or second) network slice is suitable to process the network communication if the first (and/or second) network slice has, or will have, sufficient excess available processing resources to process the network communication. The method may therefore further comprise the step of determining the processing resources available on the first and/or second network slice/s.

Preferably, the first (and/or second) network slice is suitable to process the network communication if the first (and/or second) network slice has, or will have, a number of concurrent users that is below a threshold. The method may therefore further comprise the step of determining the number of concurrent users on the first and/or second network slice/s.

Preferably, the first (and/or second) network slice is suitable to process the network communication if the first (and/or second) network slice has a network performance that is, or will be, beyond (or above) a threshold. The method may therefore further comprise the step of determining the network performance of the first and/or second network slice/s. The network performance may be determined by measuring: latency, jitter, bandwidth, packet error rate and/or Round-Trip Time (RTT). The network performance threshold may be dependent on the type of network communication.

Preferably, the first (and/or second) network slice is suitable to process the network communication if an absence of any ongoing and/or future reconfiguration associated with the first (and/or second) network slice is identified. The method may therefore further comprise the step of identifying ongoing and/or (scheduled) future reconfiguration of the first and/or second network slice/s. Optionally, the reconfiguration is a: re-starting; scaling (up, down and/or out); closing; and/or opening of the first network slice.

Optionally, identifying the first (and/or second) network slice as being unsuitable to process the network communication triggers the first network slice to reconfigure. Preferably, identifying the second network slice is performed in response to identifying the first network slice as being unsuitable.

Preferably, the network communication would cause, if processed by the first network slice, or does cause, the first network slice to become unsuitable for processing the network communication. Optionally, the registration of the UE to the first network slice would cause the first network slice to become unsuitable for processing the network communication. In which case, the network communication may cause re-configuration of the first network slice.

Preferably, the method further comprises the steps of: continuing to monitor the suitability of the first network slice to process the network communication after reallocating processing resources from the second network slice to the first network slice; and in response to identifying that the first network slice is suitable to process the network communication, reallocating network resources from the first network slice to the second network slice whilst the UE remains allocated to (or registered with) the first network slice.

Optionally, the amount of processing resources reallocated from the first network slice to the second network slice is equal to that reallocated to the first network slice from the second network slice.

Preferably, the second network slice has substantially the same configuration and/or network performance as the first network slice, when the first network slice is suitable for processing the network communication. The second network slice may therefore be configured for the same purpose as the first network slice, wherein the purposes may be a specialised function, such as eMBB, emergency services communications, Ultra Reliable, Low Latency Communications (URLLCs), etc. Optionally, the second network slice is a network slice that has the closest matching configuration and/or network performance to that of the first network slice. Optionally, the second network slice is identified in dependence on the amount of excess processing resources available and similarity of configuration to the first network slice.

Preferably, the second network slice is configured to process the network communication in a manner that is no worse than the first network slice, when the first network slice is suitable for processing the network communication. More preferably, this is when: network efficiency (cost, or other resource); network performance; Quality of Service; and/or Quality of Experience associated with processing the network communication are no worse.

Optionally, the first network slice is a network slice that is most preferred by the telecommunications network for processing the network communication, when the first network slice is suitable for handling said network communication. Optionally, the first network slice is a network slice that is preferred over the second network slice by the telecommunications network for processing the network communication, when the first network slice is suitable for handling said network communication. Preference of a network slice by the network may be dependent on: network efficiency (cost, or other resource); network performance metrics; Quality of Service; and/or Quality of Experience.

Preferably, identifying the second network slice further comprises the steps of: measuring network performance of the second network slice; and assessing whether the network performance surpasses a threshold. Alternatively, the second network slice may be preselected.

A single given network slice of the telecommunications network may be (simultaneously or sequentially) the first network slice in a first iteration of the method and the second network slice in a second iteration of the method. Processing resources may therefore be reallocated to a single network slice from another network slice, and processing resources may be reallocated from said single network slice to yet another network slice.

Optionally, at least two second network slices are identified, thereby to reallocate network resources from each of the at least two second network slices to the first network slice.

According to another aspect of the invention, there is provided a telecommunications network for managing processing resources in a telecommunications network, the telecommunication network comprising: a first network slice and a second network slice (provided, for example, by a processor), and the UE being allocated to the first network slice for processing a network communication from the UE; a processor for monitoring a suitability of the first network slice to process the network communication and for identifying a second network slice that is suitable for processing the network communication; and a controller for reallocating network resources from the second network slice to the first network slice, whilst the UE remains allocated to (or registered with) the first network slice, in response to identifying a lack of suitability of the first network slice to process the network communication, Optionally, the processor and/or the controller are arranged in a core of the telecommunications network.

According to yet another aspect of the invention, there is provided a computer-readable storage medium comprising instructions that, when executed by a processor associated with a telecommunications network, causes the telecommunication network to perform the aforesaid method.

The invention extends to any novel aspects or features described and/or illustrated herein. The invention extends to methods and/or apparatus substantially as herein described and/or as illustrated with reference to the accompanying drawings. The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

Any apparatus feature as described herein may also be provided as a method feature, and vice versa. As used herein, means plus function features may be expressed alternatively in terms of their corresponding structure, such as a suitably programmed processor and associated memory.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

In this specification the word 'or' can be interpreted in the exclusive or inclusive sense unless stated otherwise.

Furthermore, features implemented in hardware may generally be implemented in software, and vice versa. Any reference to software and hardware features herein should be construed accordingly.

The invention extends to a method of, and to a telecommunications network for, managing processing resources as described herein and/or substantially as illustrated with reference to the accompanying drawings. The present invention is now described, purely by way of example, with reference to the accompanying diagrammatic drawings, in which.

Figure 3:
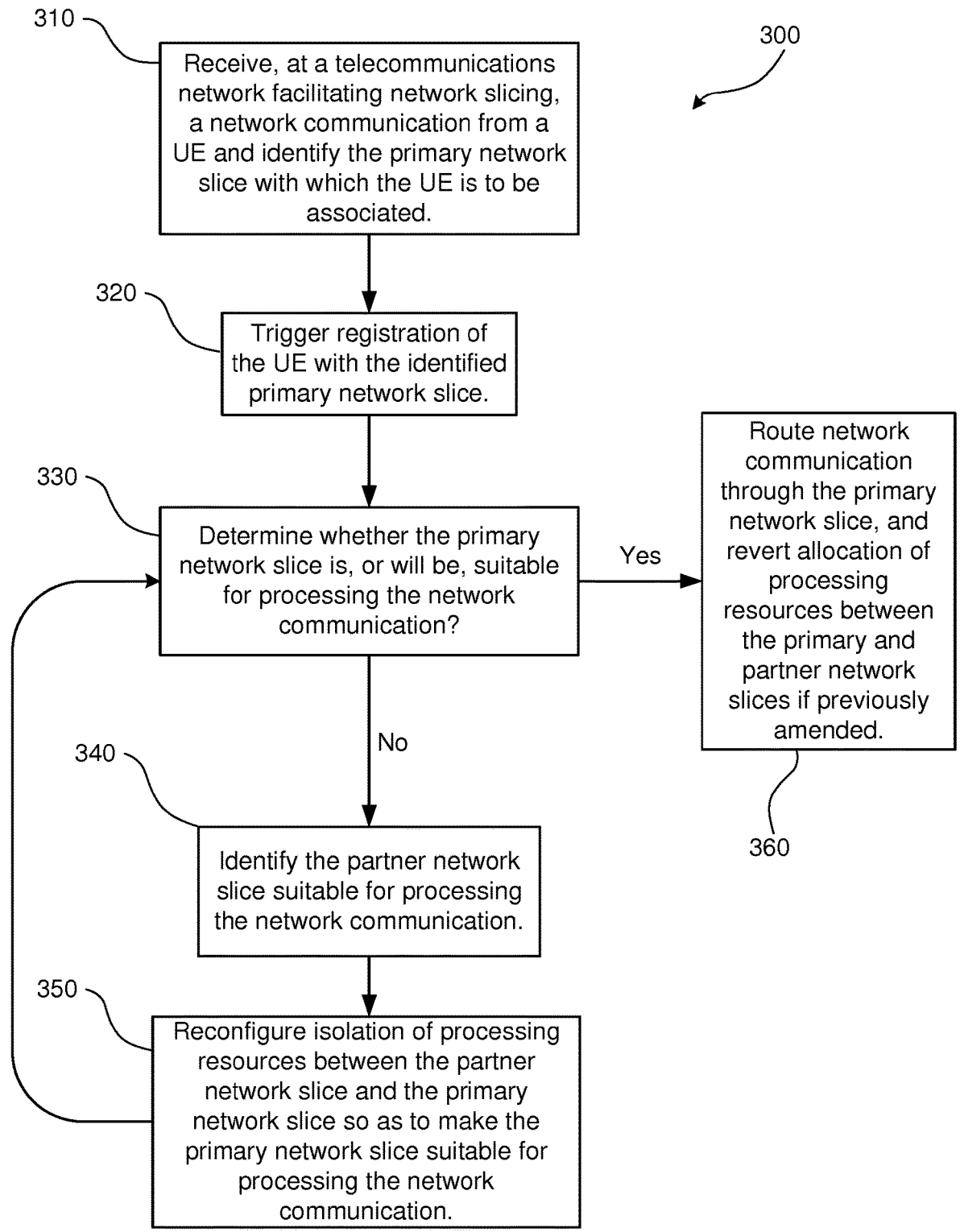
Figure 4:
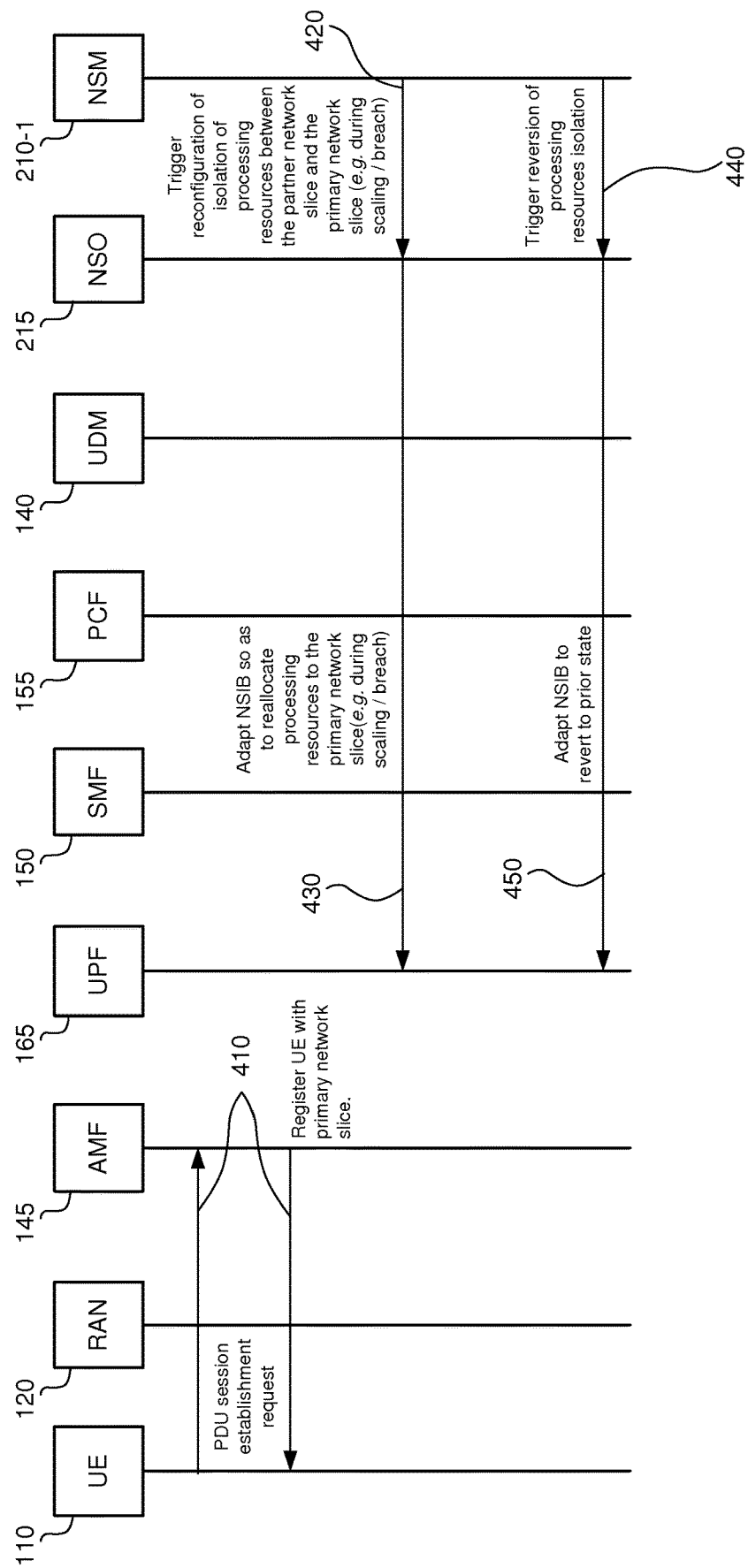
Figure 5:
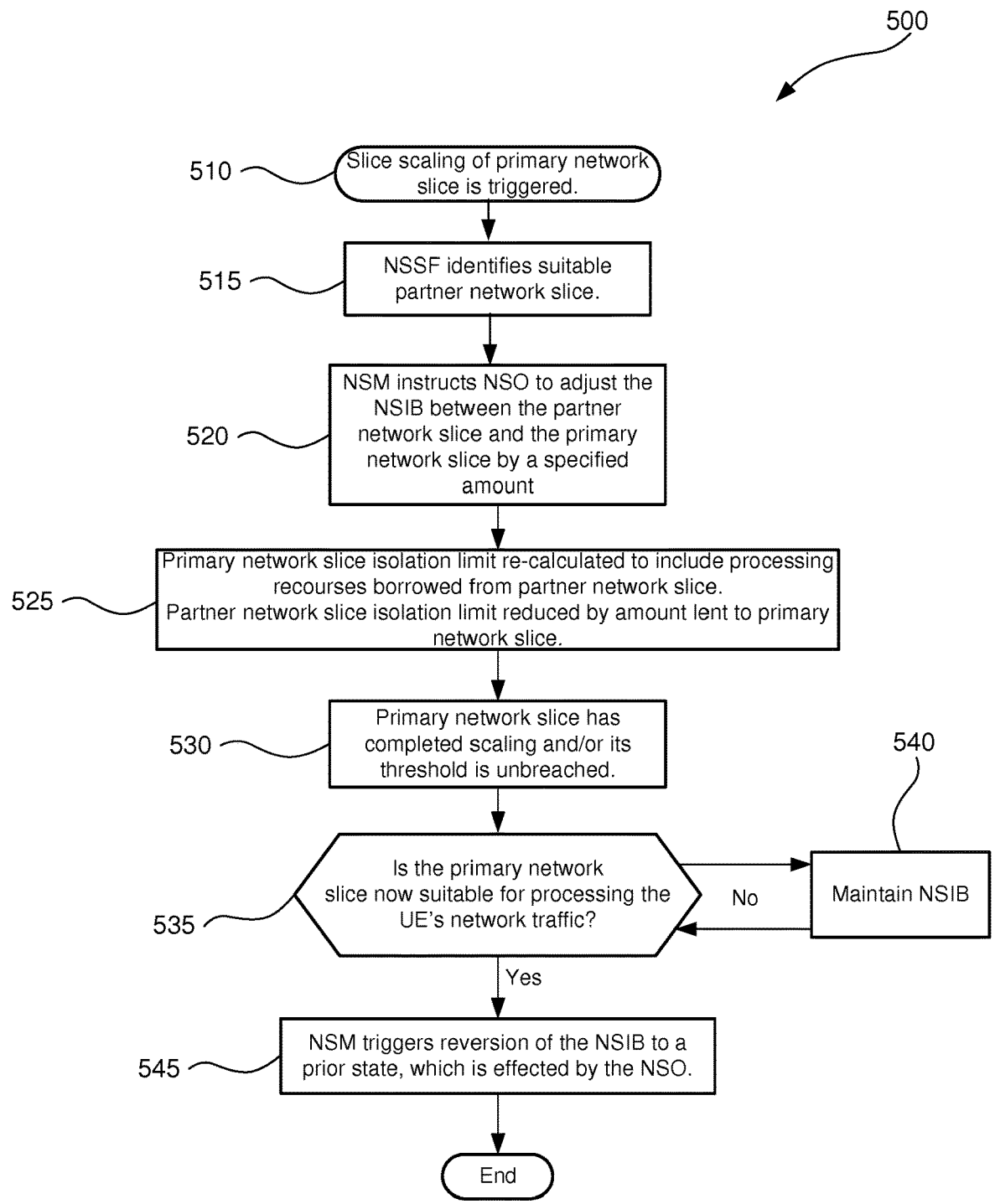

FIGS. 3, 4 and 5 outline processes for managing network slices within the network.

SPECIFIC DESCRIPTION

Figure 1:
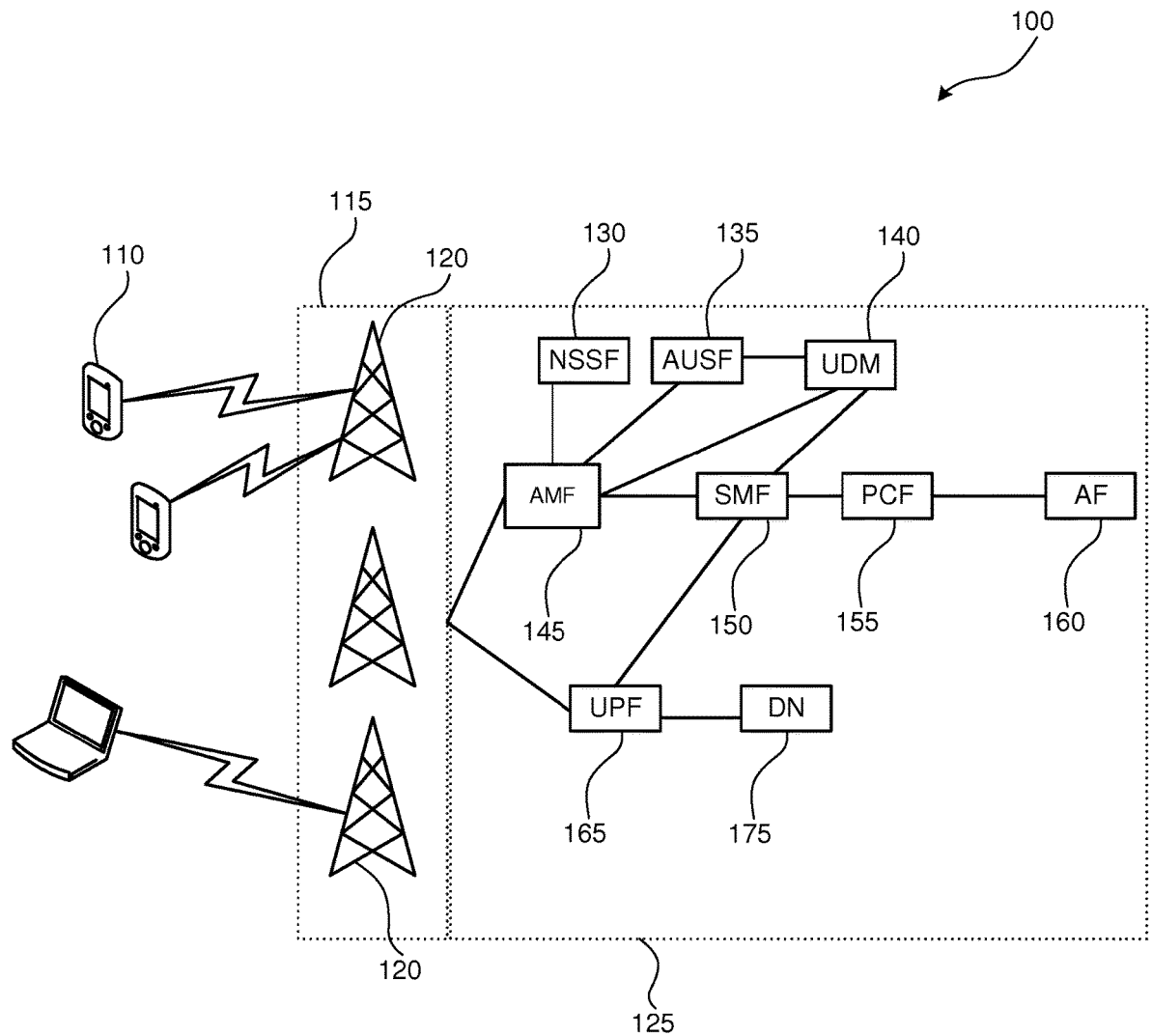
FIG. 1 shows a schematic diagram of an exemplary telecommunications network.

FIG. 1 is a schematic diagram of an exemplary telecommunications network 100.

The network 100 is shown as a mobile cellular network comprising User Equipment (UE) 110 (e.g. in the form of a mobile cellular device, laptop or tablet) that is configured to utilise the telecommunications network 100 by accessing a Radio Access Network (RAN) 115, as provided by RAN access points 120 (e.g. in the form of a macro-, micro-, pico- or femto-cell site). In turn, the RAN access points 120 are connected to a core network 125.

The network 100 operates in accordance with, for example, 5G technology. Accordingly, in this example, the core network 125 comprises the following functional components:

Network Slice Selection Function (NSSF) 130;
AUthentication Server Function (AUSF) 135;
Unified Data Management (UDM) 140;
Access and mobility Management Function (AMF) 145;
Session Management Function (SMF) 150;
Policy Control function (PCF) 155;
Application Function (AF) 160;
User Plane Function (UPF) 165; and
Data Network (DN) 175.

By means of the aforementioned functional components of the core network 125, the network 100 provides and manages a plurality of network slices. In particular, the NSSF 130 is configured to identify and to select a suitable network slice for the UE 110, and then to communicate that selection in order to help ensure that the UE is registered with the selected network slice.

The aforementioned functional components are configured to reconfigure the isolation of processing resources amongst network slices when a given network slice is temporarily unsuitable for processing a given network communication, thereby effectively to reallocate processing resources, thereby improving the processing of network communications.

Figure 2:
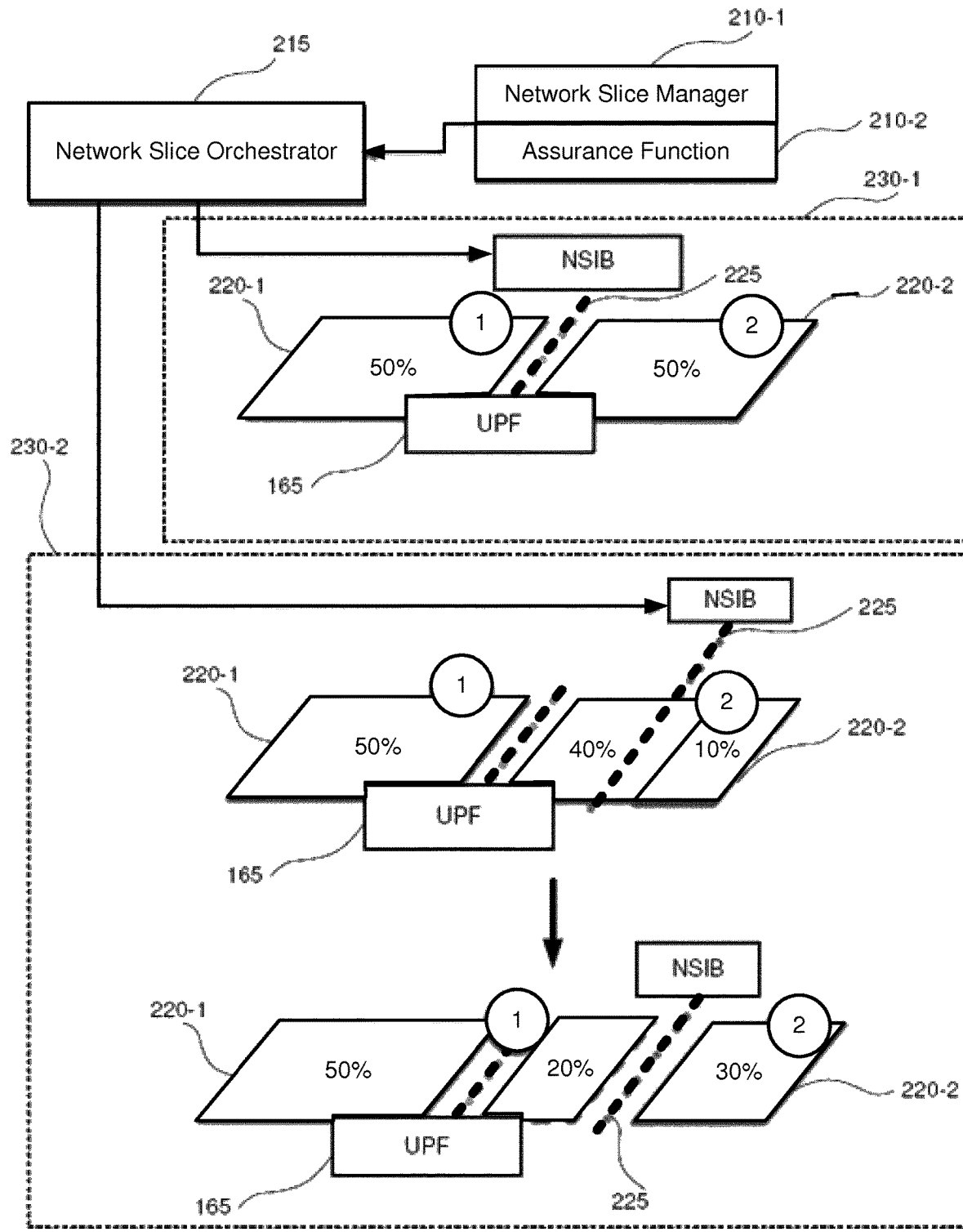
FIG. 2 shows a portion of the network.

In more detail, FIG. 2 illustrates the components of the core network 125 that are responsible for reconfiguring the isolation of processing resources amongst network slices.

Within the network core 125, there is provided a Network Slice Manager (NSM) 210-1, which is in communication with a Network Slice Orchestrator (NSO) 215 for network slices 220 and the User Plane Function (UPF) 165 for network slices 220. The NSM triggers reconfiguration of the network slices 220, and in particular triggers reconfiguration of the isolation of processing resources amongst the network slices 220, which itself is performed by the NSO 215.

The isolation of processing resources amongst the network slices 220 is implemented in logic; that is, the hardware that provides the processing resources for each network slice (e.g. a processing unit, and corresponding equipment) is common for both network slices and there is nothing purely in the hardware that defines the separation of processing resources amongst the network slices 220. The logical isolation of processing resources is provided by a Network Slice Isolation Boundary (NSIB) 225, which is a policy, implemented in code, segregating processing resources by defining the proportion of total processing resources available to a given network slice. The NSO 215 is responsible for configuring the NSIB.

For the sake of simplicity, only two network slices 220 are shown in FIG. 2, and these two network slices share the entirety of the processing resources that are available in the network core 125. In this example, in an initial configuration 230-1, the NSO 215 defines a NSIB 225 that equally partitions the total processing resources amongst the network slices 220 (each thereby having a 50% share of the total processing resources).

As part of the NSM 210-1, an Assurance Function (AsFn) 210-2 is provided that ascertains the performance of network slices 220; that is, whether individual network slices are operating and are performing sufficiently. For example, the AsFn measures: processing unit consumption; number of concurrent users; and/or performance metrics (including, for example, latency, bandwidth, jitter, error rate and/or round-trip delay time).

The UE is allocated to, and registered with, a primary network slice 220-1. The primary network slice 220-1 is the most preferred network slice, when performing as required, for processing network communications from a given UE, and it is selected, not least, in dependence on: a prescribed selection; the type of UE; the type of network communication from the UE; time; and/or the service agreement between the mobile network operator of the core network 125 and the UE.

In operation, the NSM 210-1 receives from—and/or retrieves from a database (not shown) populated by—the AsFn 210-2 data regarding the operation and performance of the primary network slice 220-1. If the primary network slice 220-1 is not suitable for processing a network communication from the UE (e.g. if it becomes unable to meet the demand requirements from the UE; that is, if it is overloaded or reaches a maximum number of users for its current 'dimensions'), then the NSM triggers the NSO 215 to adjust the NSIB 225 so as to reduce the share of processing resources available to another—partner—network slice 220-2; this occurs whilst the UE is registering with the primary network slice 220-1 and/or whilst the UE remains registered with the primary network slice 220-1. Since the partner network slice 220-2 is only utilising 10% of its allocated processing resources, it therefore has sufficient excess processing resources to loan. The NSIB is therefore adjusted so that the share of processing resources available to the partner network slice is reduced from 50% (in the initial configuration 230-1) to 30% in this second configuration 230-2. As a result, the share of processing resources available to the primary network slice increases from 50% to 70%, which provides sufficient additional processing resources in order to process the network communication from the UE, and more generally the overall demand of the first network slice.

FIG. 3, outlines in more detail a process 300 in which the partner network slice is identified and in which isolation of processing resources is reconfigured. In a first step 310, a network communication from the UE 110 is received by the network 100. The network communication is, for example, an attach request for attaching to the network. Once the (or part of the) network communication has been received by the network, the NSSF 130 identifies the primary network slice 220-1 onto which to allocate the UE. Registration of the UE with the primary network slice is subsequently triggered, and registration follows 320.

At a given moment, the identified primary network slice 220-1 may not be suitable for processing a network communication from the UE. This may be for a variety of reasons, including: an existing processing capacity breach; an insufficiency of excess available processing resources to process the network communication; downtime in the network slice; scaling (out, up and/or down) of the primary network slice in order to increase processing resources of the network slice; creation or restarting of the primary network slice without it yet fully operating; removal of the primary network slice; and/or other reconfiguring of the primary network slice. Accordingly, a determination 330 is made whether the primary network slice is (or will be within an acceptable period of time, for example by the time that the UE is registered) suitable for processing the network communication from the UE 110; this is determined by the AsFn.

If it is ascertained that the primary network slice 220-1 is not operating or performing sufficiently (e.g. because it is scaling, as triggered by the NSM), this is communicated to the NSM 210-1 (e.g. from the AsFn), and the NSSF identifies the partner network slice 220-2 in step 340.

Once identified, and its suitability (current or expected) to handle the network communication from the UE 110 has been confirmed by the AsFn 210-2, the NSSF communicates the identity of the partner network slice to the NSM, which subsequently instructs the NSO 215 to amend the NSIB 225 thereby to increase the amount of processing resources available to the primary network slice, and hence to enable the primary network slice to process the network communication. As a result, the primary network slice is protected (for example, if it is overloaded and/or scaling) and prevents or helps reduce network congestion as experienced by the UE 100 and/or by existing UEs already registered with the primary network slice 220-1.

In effect, by means of the process 300, the allocation of processing resources amongst network slices is made 'elastic', thereby dispensing with rigid isolation processing of network slices and improving resource utilisation efficiency by allowing under-utilised network slices to support over-utilised network slices. The on-demand—as and when a particular network slice requires more processing resources in order to maintain a standard of service—reallocation of processing resources from the pool of network slices 220 may provide a reliable semi-permanent solution for users when a given network slice is overloaded and/or scaling. The process 300 provides a speedier boost in processing resources—albeit at the expense of another network slice (i.e. the partner network slice)—for a network slice, compared to re-scaling a network slice, and the process may therefore be particularly effective when multiple functions of a network slice are scaling.

After the NSIB 225 has been reconfigured, the process then repeats to evaluate anew whether the primary network slice is now (or now will be) suitable for processing the (ongoing) network communication 330. If so, then the NSM reverts the NSIB 225 to its prior state 360.

It will be appreciated that the partner network slice is available to change with each loop of the process 300, since a previously-identified partner network slice may no longer be suitable to process a subsequent network communication. Accordingly, a primary network slice may become a partner network slice, and vice versa, over different iterations of process 300.

FIG. 4 is a diagram illustrating signalling between the UE and the components of the network 100 so as to perform the process 300 as show in, and as described with reference to, FIG. 3.

In a first signalling process 410, the UE 100 sends a network communication to the network 100 via the RAN 120. The AMF 145 receives and processes the network communication in order to establish a connection with the UE; this is performed, for example as outlined in the 3rd Generation Partnership Project (3GGP) Technical Specification 23.502, version 15.2.0, section 4.3.2.2, the contents of which are hereby incorporated by reference.

Once the UE has registered with the network 100, and a Protocol Data Unit (PDU) session is established, the NSSF identifies the primary network slice, onto which the UE is subsequently registered. Where it is established (by the AsFn 210-2) that the primary network slice is not suitable for handling network communications from the UE, the NSM triggers the NSSF to identify the partner network slice and subsequently triggers the NSO 215 to increase the share of processing resources available to the primary network slice 420 by reducing the share available to the partner network slice, and the NSO 215 subsequently adjusts the NSIB 225 in order to achieve this effect.

Once—if at all—the AsFn subsequently identifies that the primary network slice is suitable for handling the network communication, the NSM triggers 440 the NSO 215 to revert the NSIB to its previous state 450.

Advantageously, and as best shown in FIG. 4, this process is transparent to the UE; that is, the UE remains attached to the primary network slice, and so the process requires no further signalling with the UE to implement once the UE is registered with the network, thereby reducing overhead within the network (not least network slice admission control signals between the RAN and the UE).

FIG. 5 shows, in more detail, a process 500 by which the share of processing resources available to the partner network slice is reduced in order to assist the primary network slice when it is unsuitable for processing the network communication whilst it is scaling.

In a first step, slice scaling (up, down or out) of the primary network slice is identified (responsively or anticipatorily) 510. The NSSF then identifies a suitable partner network slice for the UE 515, and the NSM instructs the NSO to adjust the NSIB between the primary network slice and the partner network slice so as to make the primary network slice suitable for processing the network communication 520. As a result, the processing resources available to the primary network slice and the partner network slice are recalculated and logged by the AsFn, which may affect future allocation of UEs to each of the primary and partner network slices by the NSSF 525.

Steps 510 to 525 all occur whilst the primary network slice has been triggered to scale and/or is currently scaling. Once the primary network slice has scaled 530 (and/or the level of utilisation of the network slice decreases as a proportion of its total capacity), the network queries whether the primary network slice is suitable for handling the UE (as performed by the AsFn) 535. If not, the NSIB remains as is 540. If so, the NSM is informed of the suitability of the primary network slice and therefore triggers the NSO to revert the NSIB to its prior state 545.

When identifying a partner network slice, the NSSF identifies a network slice that is a most appropriate alternative to the primary network slice; that is, a network slice having the same—or a substantially similar—configuration and performance, including in relation to: latency; jitter; bandwidth; availability of processing resources; Quality of Service; Service Level Agreement; type/specialisation of network slice (e.g. Ultra-Reliable Low-Latency Communications, Mobile Broadband and enhanced, and Massive Machine Type Communications); and services available on a given network slice (e.g. Voice-over-WiFi™ calling).

In order to maintain a minimum standard of service, rules governing the selection of the partner network slice are utilised, including restrictions that the partner network slice performs no worse than the primary network slice (when it is deemed to be operating as required, for example by the AsFn).

In more detail, the AsFn 210-2, repeatedly probes all available network slices so as to identify, at least, the spare processing resources available on each network slice and the type of network slice. Each network slice may have a percentage of its processing resources available to lend, depending on current utilisation, expected utilisation, and the type of network slice. The AsFn populates a table as exemplarily shown below:

| Slice Name | Current Utilisation | Processing resources available to loan | Network Slice Type | Weighting |
| --- | --- | --- | --- | --- |
| Slice A | 70% | 20% | eMBB | 1 |
| Slice B | 40% | 25% | URLLC | 0.25 |
| Slice C | 5% | 95% | Internet of Things (IoT) | 2 |
| Slice D | 50% | 0% | Corporate network | 0.5 |
| Slice E | 40% | 50% | eMBB | 1 |

As shown in the table above, each network slice is assigned a weighting, which is used to indicate matching preference. A high weighting indicates that the network 100 prefers to utilise a network slice as a partner network slice. For example, a network slice for use with IoT devices is given a high weighting (at a value of 2 in the table above), whereas, a network slice configured for URLLC (i.e. requiring high reliability) is lowly weighted (at a value of 0.25 in the table above).

In one example, the NSSF identifies the optimal partner network slice by determining a matching factor to inform how suitable a network slice is to act as a partner network slice at a given moment in time. The matching factor is, for example, calculated as: weighting×processing resources available to loan. In the example shown in the table above, where Slice A is the primary network slice, Slice C is selected as the partner network slice since it has the highest matching factor. Where multiple network slices have the same matching factor, then the network is configured to either use the—or at least some of the—multiple network slices as partner network slices (dividing the amount of processing resources to be loaned equally amongst themselves) or selects a single network slice (e.g. at random).

ALTERNATIVE AND MODIFICATIONS

The network 100 shown in, and described with reference to, FIG. 1, is a mobile cellular network. However, it will be appreciated that the aforementioned is available to be implemented as part of any network that utilises network slicing, and more generally as part of any network utilising virtualisation to segregate network resources, including fixed line, local area, and wide area networks. In such examples, the process of managing network resources as described above is performed by functional components of such networks that are analogous to those of the network 100.

In one alternative, the UPF 165 associated with the network slices 220 alerts the NSM 210-1 and/or the AsFn 210-2 when the first network slice is no longer suitable.

The identification of the partner network slice is available to be conducted at any stage in the processes described above, in particular: prior to the UE registering with the primary network slice; after the UE registers with the primary network slice; and/or once the primary network slice is deemed unsuitable for processing the network communication.

In one example, the partner network slice is identified for a specific primary network slice (and therefore applies to all UEs that would register with a given primary network slice). In another example, the partner network slice is identified for a specific UE (that is, on a 'per-UE' basis).

It will be appreciated that reverting the NSIB 225 to a prior state (as per step 360 of process 300) is optional, and in certain circumstances it may be preferable to retain the amended NSIB, not least to reduce the processing overhead of reverting the NSIB. In yet another alternative, instead of reverting the NSIB to a prior state, the NSIB is simply reconfigured anew in order to reflect current conditions of the partner and primary network slices, for example to increase or decrease the share of processing resources surrendered by the partner network slice to the primary network slice, or vice versa.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. A method of managing processing resources in a telecommunications network, the telecommunications network having a plurality of network slices and a User Equipment (UE), wherein the UE is allocated to a first network slice to process a network communication from the UE, the method comprising the steps of:
- monitoring a suitability of the first network slice to process the network communication;
- identifying a second network slice that is suitable for processing the network communication; and
- in response to identifying a lack of suitability of the first network slice to process the network communication, reallocating processing resources from the second network slice to the first network slice whilst the UE remains allocated to the first network slice;
- wherein the reallocating of the processing resources comprises reconfiguring a logical isolation boundary between the first and second network slices.

2. The method according to claim 1, wherein the processing resources are reallocated before the network communication is received by the first network slice.

3. The method according to claim 1, wherein the step of reallocating processing resources comprises adjusting the relative share of processing resources between the first and second network slices.

4. The method according to claim 1, wherein the step of reallocating processing resources is performed without increasing the total amount of processing resources in the first and second network slices.

5. The method according to claim 1, further comprising the step of identifying the second network slice in response to identifying a lack of suitability of the first network slice.

6. The method according to claim 1, wherein the amount of processing resources reallocated to the first network slice is equal to or greater than an amount of processing resources required to render the first network slice suitable to process the network communication.

7. The method according to claim 1, wherein, after reallocating processing resources from the second network slice, the second network slice comprises a remaining amount of processing resources that is sufficient for the second network slice to be suitable for processing each network communication allocated to the second network slice.

8. The method according to claim 1, wherein the first network slice is determined to be suitable to process the network communication in response to identifying that the first network slice has sufficient excess available processing resources to process the network communication.

9. The method according to claim 1, wherein the first network slice is determined to be suitable to process the network communication in response to identifying that the first network slice has a number of concurrent users that is below a threshold.

10. The method according to claim 1, wherein the first network slice is determined to be suitable to process the network communication in response to identifying that network performance of the first network slice is beyond a threshold.

11. The method according to claim 1, wherein the first network slice is suitable to process the network communication if an absence of any ongoing and/or future reconfiguration of the first network slice is identified.

12. The method according to claim 11, wherein the reconfiguration is a: re-starting; scaling; closing; and/or opening of the first network slice.

13. The method according to claim 1, wherein identifying a lack of suitability of the first network slice to process the network communication triggers the first network slice to reconfigure.

14. The method according to claim 1, wherein the network communication would cause, if processed by the first network slice, or does cause, the first network slice to become unsuitable for processing the network communication.

15. The method according to claim 1, further comprising the steps of:
- continuing to monitor the suitability of the first network slice to process the network communication after reallocating processing resources from the second network slice to the first network slice; and
- in response to identifying that the first network slice is suitable to process the network communication, reallocating processing resources from the first network slice to the second network slice whilst the UE remains allocated to or registered with the first network slice.

16. The method according to claim 1, wherein the second network slice has substantially the same configuration as the first network slice, when the first network slice is suitable for processing the network communication.

17. The method according to claim 1, wherein network performance of the second network slice is no worse than the network performance of the first network slice, when the first network slice is suitable for processing the network communication.

18. The method according to claim 1, wherein the first network slice is a network slice that is preferred by the telecommunications network over the second network slice for processing the network communication, when the first network slice is suitable for handling the network communication.

19. The method according to claim 1, wherein a single given network slice of the telecommunications network is the first network slice in a first iteration of the method and the second network slice in a second iteration of the method.

20. The method according to claim 1, wherein identifying the second network slice further comprises the steps of: measuring network performance of the second network slice; and assessing whether the network performance surpasses a threshold.

21. The method according to claim 1, wherein at least two second network slices are identified, thereby to reallocate processing resources from each of the at least two second network slices to the first network slice.

22. A non-transitory computer-readable storage medium comprising instructions that, when executed by a processor associated with a telecommunications network, causes the telecommunication network to perform the method according to claim 1.

23. The method according to claim 1, wherein the first network slice is determined to be suitable to process the network communication in response to identifying that the first network slice will have sufficient excess available processing resources to process the network communication.

24. The method according to claim 1, wherein the first network slice is determined to be suitable to process the network communication in response to identifying that the first network slice will have a number of concurrent users that is below a threshold.

25. The method according to claim 1, wherein the first network slice is determined to be suitable to process the network communication in response to identifying that network performance of the first network slice will be beyond a threshold.

26. A telecommunications network for managing processing resources in a telecommunications network, the telecommunication network comprising:

a first network slice and a second network slice, and a User Equipment (UE) being allocated to the first network slice for processing a network communication from the UE;

a processor for monitoring a suitability of the first network slice to process the network communication and for identifying a second network slice that is suitable for processing the network communication; and a controller for reallocating processing resources from the second network slice to the first network slice, whilst the UE remains allocated to the first network slice, in response to identifying a lack of suitability of the first network slice to process the network communication, wherein the reallocating of the processing resources comprises reconfiguring a logical isolation boundary between the first and second network slices.

* * * * *